2,979,484
MANUFACTURE OF PHENOLIC RESINS

Cyril Aubrey Redfarn, London, England, assignor to Walker Extract and Chemical Company Limited, Bolton, England, a British company No Drawing. Filed Apr. 28, 1955, Ser. No. 504,680

9 Claims. (Cl. 260—51)

This invention is for improvements in or relating to the manufacture of phenolic resins and has for an object to provide products having properties greatly modified as compared with the properties of the usual phenol formaldehyde resins, particularly in relation to thermal stability.

The conventional idealised over-simplified accepted structure for thermoset, that is cured, cross-linked phenol-formaldehyde resins, consists of phenolic nuclei joined together by methylene bridges in the ortho- and para- positions.

Such resins decompose when maintained at temperatures between 180° C. and 200° C. This is not surprising in view of the essentially hydrocarbon nature of the resin. On destructive distillation, cured phenol-formaldehyde resins yield substantial quantities of aliphatic substituted phenols, thus suggesting that the phenolic nuclei of the resins are more heat-stable than the methylene bridges.

Hence, if more heat-resistant bridges than the methylene bridges could be introduced into phenolic resins, it would appear possible that phenolic resins of greater heat-resistance could be produced. The most promising approach to the problem would be to try and introduce inorganic links between the phenolic nuclei.

This is effected to a partial extent in triphenyl phosphate—a well-known plasticiser used for improving the fire-resistance of cellulose acetate plastics—which is made from phosphorus oxychloride and phenol.

Now, when phenol-formaldehyde resins are made with about two-thirds of the normal formaldehyde ratio, i.e. 1 mol phenol : 0.8 mol formaldehyde, substantially non-curing resins are obtained; curing (cross-linking) is obtained by heating with about 10% by weight of hexamethylene tetramine, a convenient formaldehyde donor.

On heating triphenyl phosphate with hexamethylene tetramine, however, a cured resin is not obtained since, as is well-known, when the hydroxyl group in a phenol is esterified, the phenolic ester no longer shows the usual well-marked reactivity towards formaldehyde in the ortho- and para- positions. The invention is based on the theory that, if a phenolic phosphate type of compound could be made with a dihydroxy benzene compound, one hydroxyl group would be used up by reaction with the phosphate radical and the other hydroxy group woul remain unesterified to render the phenolic nucleus reactive towards formaldehyde for cross-linking.

Many prior proposals exist for the production of high molecular weight products in which phenolic nuclei are bridged by phosphorus-containing groups by reacting polyhydroxy phenolic compounds (both mono- and poly-nuclear) with polyfunctional derivatives of phosphoric acid, such as phenyl phosphonyl dichloride, phosphorus oxychloride, phosphorus trichloride and phosphorus pentoxide. In some of these prior proposals, the polyfunctional derivative of phosphoric acid used is difunctional with a view to producing linear products but, in all cases, the proportions of the reactants and the conditions of reaction are such that substantially all the phenolic hydroxy groups are reacted so that the products are, like triphenyl phosphate, unreactive with cross-linking agents, such as formaldehyde. Thus the prior products are incapable of being cured by reaction with formaldehyde although some of those products may undergo further polymerisation under the influence of heat.

The present invention, however, is directed to the production of products containing a substantial proportion of unreacted phenolic hydroxy groups so that a high degree of reactivity with formaldehyde is obtained enabling the products of the present invention to undergo a thermo-setting reaction similar to that of the conventional phenol-formaldehyde resins.

With the foregoing explanation it may now be stated that the invention provides a process for the production of thermo-settable polynuclear phenolic compounds containing inorganic linkages and reactive with formaldehyde which comprises forming the polybasic inorganic acid partial ester of a polyhydroxy aromatic compound, having an unsubstituted position reactive with formaldehyde, by heating said polyhydroxy aromatic compound with boric acid, an inorganic phosphoric acid or a poly-functional chlorine derivative thereof or phosphorus trichloride in such proportions and under such conditions that a substantial proportion of the phenolic hydroxy groups remain unreacted.

The inorganic phosphoric acids used in the process of this inveniton are the ortho-, meta- and polyphosphoric acids including the cyclic meta-phosphoric acids and the poly-functional chlorine derivatives thereof include phosphorus pentachloride and phosphorus oxychloride.

The compounds produced by the process above set forth are thermo-settable compounds capable of being cured or cross-linked by reaction with an aldehyde, for example, formaldehyde or a polymer thereof or compounds decomposable by the action of heat to yield an aldehyde, for example, hexamethylenetetramine and trishydroxymethyl phosphine oxide as with conventional phenolic resins.

It has been found that it is possible to modify the phenolic resins so as to effect an internal plasticisation and thereby produce products having a greater degree of flexibility and this is effected by including a mono-hydroxy aromatic compound in the reaction mixture.

By operating in this manner there is introduced into the phenolic resin molecule one or more aromatic groups which, by reason of the reaction of the single hydroxy group thereof with the polybasic inorganic acid, is a group unreactive towards formaldehyde thereby effecting a plasticisation of the molecule.

A feature of the invention consists in that said mono-hydroxy aromatic compound is employed in the form of a partial ester thereof with the same or a different polybasic inorganic acid as that used for reaction with the polyhydroxy aromatic compound. Such a partial ester may, for example, be mono-phenyl phosphate, a substance which is a by-product in the manufacture of triphenyl phosphate.

By suitably proportioning the amount of the polyhydroxy and monohydroxy aromatic compounds, a desired degree both of plasticisation and formaldehyde reactivity can be obtained.

Useful products are also obtainable when there is added to the resins prepared as above described a metallic compound such as aluminium octoate and still other useful products are obtained when a polyphosphonitrilic chloride is reacted together with the other ingredients.

Various polyhydroxy phenols such as resorcinol, hydroquinone and phloro-glucinol (1,3,5-trihydroxybenzene) have been reacted with phosphoric acid, phosphorus oxychloride, phosphorus pentachloride and boric acid to give fusible resins which thermoset on heating with a little hexamethylenetetramine.

With phosphorus oxychloride or pentachloride, hydrogen chloride is given off; the reaction can be carried out in pyridine or other acid acceptor so that the hydrogen chloride is absorbed.

Experiments with phosphoric acid and resorcinol and/or hydroquinone have shown that tarry resinous products are apt to be produced. Reaction with phosphorus pentachloride in pyridine does not produce tarry products but there are objections, from the industrial point of view, to the use of large amounts of pyridine.

Resorcinol is the preferred polyhydroxy phenol because it is, as a meta-dihydroxy benzene, the most reactive of the phenols and also it is preferred since it is the cheapest of the polyhydroxy phenols.

It will be appreciated that a mixture of phosphoric acids or of phosphoric and boric acids may be used and further that any of the phosphorus chlorine compounds mentioned may be used in admixture with one or another or with the said acid or acids.

The following examples illustrate the manner in which the invention may be carried into effect, parts and percentages being calculated by weight.

*Example 1*

A reaction mixture was prepared from the following:

| | Parts |
|---|---|
| Hydroquinone | 11 |
| Resorcinol | 11 |
| Boric acid | 12.4 |

The above substances were mixed together in a flask and heated under a short reflux air condenser which allowed for the escape of water vapour but prevented the possible loss of resorcinol by vaporization in the steam.

The mixture became liquid at about 110° to 120° C. and water was given off. Gradually the temperature rose to 200° C. and was kept between this temperature and 240° C. until only a small amount of water vapour was being evolved. The hot liquid was poured out on to a flat tray and, on cooling, formed a red brittle water-soluble resin.

The resin thus produced, thermoset when heated with 5% of hexamethylenetetramine.

*Example 2*

The reaction mixture was made up from the following:

| | Parts |
|---|---|
| Hydroquinone | 22 |
| Boric acid | 12.4 |

The above substances were mixed and reacted together as described in Example 1. The resin, on cooling, was a clear, off-white, brittle water-soluble resin. The resin thus prepared thermoset when heated with 5% of hexamethylenetetramine.

*Example 3*

The reaction mixture was made up from the following:

| | Parts |
|---|---|
| Hydroquinone | 11 |
| Resorcinol | 11 |
| Boric acid | 18.6 |

The above substances were mixed and reacted together as described in Example 1, the temperature rising, however, to a final value of 280° C. The resin so formed was a dark red, tough water-soluble resin. The resin thus prepared thermoset when heated with 5% of hexamethylenetetramine.

*Example 4*

The reaction mixture was made up from the following:

| | Parts |
|---|---|
| Hydroquinone | 22 |
| Boric acid | 18.6 |

The above substances were mixed and reacted together as described in Example 1 to give a pale, water-soluble brittle resin which thermoset when heated with 5% of hexamethylenetetramine.

*Example 5*

The reaction mixture was made up from the following:

| | Parts |
|---|---|
| Resorcinol | 16.5 |
| Phosphoric acid | 9.8 |

The above substances were mixed and reacted together as described in Example 1 to give a dark-brown water-soluble resin which thermoset when heated with 5% of hexamethylenetetramine.

*Example 6*

A reaction product was formed by mixing together 12.5 parts of phenol (M.P. 41° C.), 14.6 parts of hydroquinone and 22.9 parts of boric acid and heating under reflux so that water vapour was allowed to escape without loss of phenolic compounds. Refluxing started at 98° C. and during the course of 1 hour the reaction temperature was raised to 202° C. The product was a grey solid together with a small quantity of a dark oily substance. The resin mixture cured to a brown solid at 200° C. when mixed with 5% hexamethylenetetramine.

*Example 7*

In order to substantially inhibit the formation of the oily by-product in Example 6, that example was repeated with the addition of 11 parts of water to the reaction mixture. Refluxing was carried out for 2½ hours when the temperature reached 205° C. The product was a grey resin which could be ground to give a white powder. The resin thermoset to a somewhat flexible product when heated at 200° C. with 5% hexamethylenetetramine for 2 minutes, 35 seconds. The resin also thermoset when mixed with 10% trioxane at 200° C. in 35 seconds.

*Example 8*

The reaction mixture was made up as follows:

| | Parts |
|---|---|
| Phenol | 4.7 |
| Resorcinol | 9.6 |
| Hydroquinone | 9.6 |
| Boric acid | 18.6 |
| Water | 9.0 |

The four solid substances were thoroughly dry mixed together whereafter water was added and thereafter the reaction mixture was heated under a reflux condenser which was arranged to permit of the escape of water vapour but to condense the phenolic materials. Over the course of 1 hour the temperature of the reaction mixture was gently raised to 200° C. and the final product was a brown, pliable and sticky resin which thermoset on heating with 5% of paraformaldehyde.

*Example 9*

The reaction mixture was made up from the following:

| | Parts |
|---|---|
| Phenol | 12.5 |
| Hydroquinone | 7.3 |
| Resorcinol | 7.3 |
| Boric acid | 22.9 |
| Water | 11.0 |

All the above ingredients were thoroughly mixed into a paste and refluxed under a short reflux condenser which allowed the escape of water vapour but condensed the phenolic substances. As the water vapour was removed the temperature was raised until, after a period of 5 hours, a temperature of 210° C. was reached. The final product was an orange-coloured resin which set on cooling to a semi-flexible solid having an acid value of 5.6.

When admixed with 5% of hexamethylenetetramine this resin thermoset to a somewhat flexible product in 1½ minutes at 200° C.

Example 10

The reaction mixture was prepared from the following:

|  | Parts |
|---|---|
| Phenol | 6.8 |
| Hydroquinone | 11.0 |
| Resorcinol | 11.0 |
| Phosphoric acid (90%) | 32.7 |

The constituents were thoroughly mixed together and heated to reflux under a short reflux condenser. Heating was carried out for ½-hour at 150° C. and then for 2 hours at 200° C. The product was a black semi-solid resin which thermoset at 200° C. in 59 seconds when mixed with 5% of hexamethylenetetramine.

Example 11

A reaction mixture was prepared from the following ingredients:

|  | Parts |
|---|---|
| Monophenyl phosphate | 12.1 |
| Resorcinol | 11.0 |
| Hydroquinone | 11.0 |
| Boric acid | 14.3 |

The above materials were thoroughly dry mixed together, heated under a reflux condenser arranged to permit the escape of water vapour but to condense the phenolic substances. The temperature was gradually raised to about 200° C. in 1 hour to yield a brown somewhat pliable and sticky resin which thermoset with 5% of paraformaldehyde.

Example 12

The reaction mixture was prepared from the following:

|  | Parts |
|---|---|
| Phenol | 94 |
| Phosphorus oxychloride | 153.5 |
| Phloroglucinol | 84 |

The phenol and phosphorus oxychloride were mixed in a 3-neck flask fitted with a reflux condenser. The mixture was warmed on a water-bath to 50° C. when small additions of the phloroglucinol were started. Vigorous reaction took place on each addition of phloroglucinol and the temperature of the mixture was kept below 80° C. with cooling water. After the addition of all the phloroglucinol was complete (1 hour), the reaction temperature was raised to 120° C. for 1 hour. A dark red, viscous liquid was obtained which was washed with warm water and dried by vacuum distillation at 80° C. under 25mm. pressure.

The final product was a solft, brown resin which, when mixed with 10% of hexamethylenetetramine, set to a brown solid at 200° C. in 1 minute. It was also found that the above resin could be thermoset at a temperature of 150° C. in 4 minutes if mixed with 10% of hexamethylenetetramine.

Example 13

The reaction mixture was prepared from the following:

|  | Parts |
|---|---|
| Hydroquinone | 165 |
| Phosphorus oxychloride | 153.5 |

The hydroquinone was dissolved in the phosphorus oxychloride at 110° C. and the temperature was then raised over a period of 20 minutes to 140° C. Refluxing was continued for a further 20 minutes when the reaction temperature was raised to 170° C. and maintained at this temperature for 25 minutes. The product was a pale, amber-coloured liquid which set to a slightly sticky solid on cooling and had a pungent odour. This resin thermoset on heating with hexamethylenetetramine.

Example 14

The reaction was carried out as in Example 13 above except that the hot liquid resin was washed in water and dried under reduced pressure at 120° C. The product set on cooling to a pale amber resin free from odour, but slightly sticky. This resin thermoset on heating with hexamethylenetetramine.

Example 15

The reaction mixture was prepared from the following:

|  | Parts |
|---|---|
| Phenol | 282 |
| Hydroquinone | 330 |
| Phosphorus oxychloride | 462 |

All the ingredients were heated together at 135° C. in an oil bath until solution was complete. The mixture was then heated to reflux (135° C.) for 2 hours when the temperature was raised to 150° C. for 2 hours. The product was an amber-coloured viscous syrup which was washed with water and dried under reduced pressure.

The amber-coloured syrup, when mixed with 10% of hexamethylenetetramine, set to a yellow rubbery solid in 3 minutes at 200° C.

Example 16

The reaction mixture was prepared from the following:

|  | Parts |
|---|---|
| Resorcinol | 11.0 |
| Hydroquinone | 11.0 |
| Boric acid | 18.6 |

All the ingredients were ground together and placed in a flask fitted with a reflux condenser. The mixture was heated in an oil bath at 145° C. for 20 minutes and then heating was continued for 2 hours at 200°–220° C. The product was a dark red liquid which set on cooling to a brown resin and thermoset with 10% paraform.

Example 17

A phenolic resin was prepared by refluxing 8.3 parts phenol (M.P. 41° C.) with 16.6 parts formaldehyde (37%) under alkaline conditions for 35 minutes. The final pH of the resin which contained some free formaldehyde was adjusted to 7.1 with lactic acid before concentrating the solution to 80% solids by vacuum distillation.

To a mixture consisting of 5 parts of the above phenolic resin and 2 parts alcohol, 5 parts of a resin prepared according to Example 13 were added. The viscous resin solution obtained did not char when brushed on to steel strips and heated to 450° C. for 15 minutes, during the early part of which heating the mixture thermoset. Similar steel strips coated with an alcoholic solution of the phenolic resin alone were heated to 280° C. In this case the coating became charred in 3 minutes.

Example 18

The reaction mixture was prepared from the following:

|  | Parts |
|---|---|
| Resorcinol | 165 |
| Phosphorus oxychloride | 154 |

The resorcinol was dissolved in the phosphorus oxychloride by heating on a water bath at 100° C. After 2 hours the mixture was transferred to an oil bath and refluxed gently for 20 minutes at 130° C. The dark red syrup obtained was washed with hot water and dried under vacuum at 120° C. The dried resin was ground to a dark brown powder. It was mixed with 10% of paraformaldehyde and heated at 150° C. The resin set to a hard solid in 3¼ minutes.

Example 19

A reaction mixture was prepared from the following:

| | Parts |
|---|---|
| Hydroquinone | 22.0 |
| Phosphorus pentachloride | 16.7 |

The hydroquinone was heated to melting point (170° C.) and the phosphorus pentachloride was then added in small portions with vigorous stirring. When the addition was complete, the mixture was heated to 165° C. for 1 hour. The hot liquid resin was divided into two portions, one being poured into a tin tray to cool and the second portion was poured into water, washed well and dried under vacuum.

The unwashed resin was mixed with 10% of hexamethylenetetramine and thermoset to a soft rubbery solid in 17 minutes at 200° C.

The washed resin thermoset under the same conditions in 15 minutes.

Example 20

The reaction mixture was prepared from the following:

| | Parts |
|---|---|
| Tolu-hydroquinone | 37.2 |
| Phosphorus oxychloride | 30.8 |

The tolu-hydroquinone was melted by heating in an oil bath at 124° C. in a bolt-head flask fitted with a stirrer. The phosphorus oxychloride was added slowly over a period of 30 minutes after which the temperature was raised to reflux the brown liquid formed. Refluxing was continued for 1 hour during which time the liquid in the flask became dark brown. The product was divided into two portions, one of which was poured into water and washed and dried, while the other was left unwashed.

The dry resins were in each case dark-brown, brittle solids, which thermoset when mixed with 10% of hexamethylenetetramine and heated at 200° C. The unwashed resin set to a soft solid in 5¼ minutes whereas the washed resin set hard in 3½ minutes.

Example 21

A reaction mixture was prepared from the following:

| | Parts |
|---|---|
| Hydroquinone | 33.0 |
| Paraformaldehyde | 3.2 |
| Phosphorus oxychloride | 30.8 |

The hydroquinone and phosphorus oxychloride were refluxed together for ½-hour at 130° C. and the paraformaldehyde was then added slowly over a period of 10 minutes. The liquid became viscous. The reaction temperature was raised to 165° C. for ½-hour and the product was poured into hot water and washed well before drying under reduced pressure. The hard black resin obtained could be cured to a hard solid, without the addition of further curing agent, by heating for 7 minutes at 200° C., due to its content of paraformaldehyde.

Example 22

The reaction mixture was prepared from the following:

| | Parts |
|---|---|
| Hydroquinone | 165 |
| Diphenylolpropane | 342 |
| Phosphorus oxychloride | 308 |

The hydroquinone and phosphorus oxychloride were refluxed together at 130° C. for ½-hour. The amber-coloured liquid produced was cooled to 100° C. and the diphenylol propane was added in small quantities over a period of 20 minutes. The temperature was then raised to 160° C. for 1 hour after which the liquid resin was divided into two portions, one of which was washed with hot water while the other was left to cool in a tin tray. Both products were transparent dark red resins, the washed product being harder and more brittle than the unwashed resin.

When ground up with 10% of hexamethylenetetramine the washed product cured to a stiff rubbery solid at 200° C. after 3½ minutes. The unwashed product under the same conditions set to a very soft rubber after 8 minutes.

Example 23

The reaction mixture was prepared from the following:

| | Parts |
|---|---|
| Hydroquinone | 330 |
| Phosphoric acid (90%) | 147 |
| Boric acid | 31 |

The hydroquinone, boric acid and phosphoric acid were heated to give a homogeneous mixture in an oil bath at 150° C. The mixture was refluxed for 3 hours when the temperature reached 200° C. The product was poured into water, washed and dried under reduced pressure.

A grey brittle resin was obtained which thermoset with 10% of hexamethylenetetramine at 200° C. in 2¼ minutes to a rubbery solid.

Example 24

A resin was prepared as in Example 18 and ground to a powder passing through a wire screen of 85 mesh size. A moulding powder was made as follows:

| | Parts |
|---|---|
| Resin | 10 |
| Hexamethylenetetramine | 1 |
| Asbestos power | 15 |

The powders were thoroughly mixed in a ball mill for 2 hours. The powder was moulded into an ash-tray by heating at 145° C. for 20 minutes under a pressure of 1500 lbs. per sq. in. The moulding was hard and tough, with good flame resistance.

A similar moulding was obtained when the asbestos powder was replaced by china clay, but in this case the moulding was more brittle.

Example 25

A resin was prepared as in Example 7 and dissolved in ethyl alcohol to give a 50% solution. To 10 parts of this solution were added 5 parts of a conventional urea-formaldehyde adhesive resin syrup which had been concentrated to 70% solids. The mixed resin solution was brushed on a glass sheet and dried for 1 hour at 80° C. followed by 1 hour at 135° C. during which the mixture thermoset owing to the urea-formaldehyde resin syrup acting as a formaldehyde donor. A clear coating was formed on the glass indicating complete compatibility of the resins.

Example 26

A resin was prepared as in Example 9. This resin was ground up with (1) 10% trioxane and (2) 10% furfural. It was found that with trioxane the resin set to a hard powder in 35 seconds at 200° C. and with furfural as the cross-linking agent the resin set to a hard, black solid in 25 seconds at 200° C.

Example 27

Resin prepared as in Example 7 was dissolved in industrial methylated spirit (74° overproof) to give a 25% resin solution. To this solution was added a mixture containing equal weights of 37% solution of formaldehyde in water and the methylated spirit in such amount as to give an addition of 10% by weight of formaldehyde based on the resin solids. The solvent was evaporated from a part of the solution at room temperature and the resulting mixture was ground to a fine powder. On heating at 150° C. it was found that this resin thermoset to a hard solid in 2 minutes. The remaining solution was applied to a fired clay surface and after allowing 6 hours for evaporation of the solvent at room temperature, it was heated to 200° C. for 15 minutes. On cooling it was found to have a reduced moisture permeability.

Example 28

A reaction mixture was prepared from the following:

| | Parts |
|---|---|
| Resin from Example 14 | 84.0 |
| Aluminium octotae | 8.4 |

The resin was first liquified at 100° C. when the aluminium octoate was added. The mixture was then heated for 45 minutes at 150° C. under reflux conditions. The cooled product was a hard transparent dark, amber-coloured resin. When mixed with 10% of hexamethylenetetramine, the resin set to a rubbery solid in 1¼ minutes at 200° C.

Example 29

A resin prepared as in Example 14 was finely ground with (1) 60% by weight of tetra-kis-(hydroxymethyl) phosphonium chloride, and (2) 60% by weight of tris-(hydroxymethyl) phosphine oxide. The first mixture set to a soft rubbery solid on heating at 200° C. for 2½ minutes while the other mixture, under the same conditions, set to a soft rubber in 3¼ minutes.

Example 30

A resin was prepared as in Example 7 and ground to a fine powder with 10% of hexamethylenetetramine. To 32.5 parts of this mixture 70 parts of powdered graphite were added and the whole thoroughly mixed in a ball mill for 24 hours. A disc was moulded from the above mixture by pressing at 145° C. for 10 minutes at ½-ton per sq. in. pressure and then baking at 200° C. for ½-hour.

The hard polished moulding was heated in a Bunsen flame to dull red heat for 12 minutes and found to retain its shape and strength.

Example 31

A reaction mixture was prepared from the following:

| | Parts |
|---|---|
| Pyrogallol | 130 |
| Phosphorus oxychloride | 110 |

The pyrogallol was dissolved in the phosphorus oxychloride at 90° C. and heated for 20 minutes on a water bath at 100° C. The product was a purple, viscous syrup when cold and when mixed with 10% of hexamethylenetetramine and heated at 200° C. for 10 seconds, the resin set to a hard solid.

Example 32

A reaction mixture was prepared from the following:

| | Parts |
|---|---|
| Catechol | 170 |
| Phosphorus oxychloride | 150 |

The catechol was dissolved in the phosphorus oxychloride at 100° C. in the course of ½-hour. The mixture was refluxed for 30 minutes at 140° C., followed by 50 minutes at 216° C. and finally for, 1¼ hours at 250° to 260° C. The product was a dark-brown, sticky solid resin which, when mixed with 30% of hexamethylenetetramine, thermoset at 300° C. in 3 minutes.

Example 33

A reaction mixture was prepared from the following:

| | Parts |
|---|---|
| Pyrogallol | 130 |
| Phosphorus oxychloride | 110 |

The pyrogallol was dissolved in the phosphorus oxychloride at 90° C. and heated for 20 minutes on a water bath at 100° C. The product was a purple, viscous syrup when cold and thermoset when mixed with 10% of paraformaldehyde and heated at 200° C. for 30 seconds to a hard solid.

Example 34

A reaction mixture was prepared from the following:

| | Parts |
|---|---|
| Catechol | 170 |
| Phosphorus oxychloride | 150 |

The catechol was dissolved in the phosphorus oxychloride at 100° C. in the course of ½-hour. The mixture was refluxed for 30 minutes at 140° C. followed by 50 minutes at 216° C. and finally for 1¼ hours at 250° to 260° C. The product was a dark-brown, sticky solid resin which, when mixed with 30% of paraformaldehyde thermoset at 300° C. in 5 minutes.

Example 35

A mixture of 41.3 parts of resorcinol, 21.1 parts of phosphorus oxychloride and 13 parts of polyphosphonitrilic chloride (the latter of mixed molecular complexity) was heated at 100° C. for 2 hours and then at 130° C. for 20 minutes. The dark red gum was cooled, washed with hot water and the residual gum dried at 120° C. in vacuum for 2 hours. When mixed with 10% of paraformaldehyde and heated at 150° C. for 10 minutes the gum set to a hard solid.

Example 36

A mixture of 41.3 parts of resorcinol, 21.1 parts of phosphorus oxychloride, and 19.6 parts of polyphosphonitrilic chloride (the latter of mixed molecular complexity) was heated at 100° C. for 2 hours and then at 130° C. for 40 minutes. The product was a hard, dark-brown solid which was further hardened by mixing with 10% of paraformaldehyde and curing at 150° C. for 4 minutes.

Example 37

A mixture of 41.3 parts of resorcinol, 29 parts of phosphorus oxychloride and 10.9 parts of polyphosphonitrilic chloride (the latter of mixed molecular complexity) was treated exactly as in the preceding example and gave a hard, infusible resin on heating with 10% of paraformaldehyde.

Example 38

A mixture of 41.3 parts of hydroquinone, 21.1 parts of phosphorus oxychloride and 13 parts of polyphosphonitrilic chloride (the latter of mixed molecular complexity) was heated at 110° C. for 2 hours, raised to 140° C. during 20 minutes and maintained at this temperature for 20 minutes. The temperature was then raised to 170° C. during 15 minutes and kept at this figure for 25 minutes. On cooling the pale brown gum set to a hard solid. This solid was cured by heating with 10% of paraformaldehyde.

Example 39

A mixture of 41.3 parts of hydroquinone, 29 parts of phosphorus oxychloride and 7.3 parts of polyphosphonitrilic chloride (the latter of mixed molecular complexity) was treated exactly as in the previous example and gave a cured resin on heating with 10% of paraformaldehyde.

Example 40

A mixture of 41.3 parts of hydroquinone, 21.1 parts of phosphorus oxychloride and 19.6 parts of polyphosphonitrilic chloride (the latter of mixed molecular complexity) was treated exactly as in the preceding example and gave a cured resin on heating with 10% of paraformaldehyde.

Example 41

A mixture of 41.3 parts of hydroquinone, 29 parts of phosphorus oxychloride and 10.9 parts of polyphosphonitrilic chloride (the latter of mixed molecular complexity) were treated as in the preceding example and gave a cured resin on heating with 10% of paraformaldehyde.

*Example 42*

A graphite beaker was impregnated with a 25% solution in methyl ethyl ketone of the uncured resin, prepared as described in Example 38, by filling the beaker with the hot solution and allowing absorption to finish, finally under a vacuum. The beaker was emptied and the solvent partially removed under vacuum. The beaker was impregnated with a formalin solution and was then baked in an oven at 200° C. for 20 minutes to effect thermosetting of the resin. This treated beaker was much more impervious to water than was an untreated control.

*Example 43*

147 parts of phosphoric acid (1.5 mols) and 31 parts of boric acid (0.5 mol) were preheated to 170° C. At 140° C. most of the water was expelled, leaving a pasty mass. 330 parts hydroquinone (3 mols) was added and well mixed in. The resulting mixture was heated at 200° C. for 3 hours. Water was slowly evolved giving a very thick brown-black paste. This material thermoset to a hard black resin when heated with 10% of hexamethylenetetramine at 200° C. for 2 minutes.

Two types of resin can be produced. A "Novolak" type which requires heating with hexamethylenetetramine for curing and the resol type obtained by reacting the "Novolak" type resin with formalin.

The cured resins contain a high proportion of inorganic material and are hence much more heat-resistant than conventional phenolic resins. Further, boric acid and phosphoric acid are well-known constituents of fireproofing compositions.

The general properties of the "Novolak" type resins are that they are hard, tough, transparent, resinous products (the hydroquinone-boric acid resin being nearly water-white and transparent), soluble in water and incombustible in that they melt and blacken without flaming when held in a Bunsen flame. The cured resins are insoluble and of substantially the same flame-resistance since the amount of formaldehyde required for crosslinking is relatively small.

The new phenolic resins produced according to the invention are particularly valuable having regard to their greatly reduced content of organic matter and they have considerable fire- and heat-resisting properties due to the known fire-proofing characteristics conferred by the phosphorus and boron atoms.

The resins of the present invention can be used for the usual processes to which the familiar phenol-formaldehyde resins are subjected and thus may be used as moulding material, particularly for insulation purposes, where their fire-proofing and flame-resistant characteristics are of value, and as adhesives and they may further be used in the form of fire-proofing compositions for application to textile materials and paper. In addition, owing to their enhanced thermal stability, the resins produced in accordance with the present invention are valuable bonding agents in the manufacture of frictional materials, such as brake-linings, clutches and for other uses where the fabricated product is subject in use to the effect of elevated temperatures. Where the chlorine compounds of phosphorus are employed and the whole of the chlorine is not reacted, it is found that at high temperatures, in the neighbourhood of 300° C. and above, the chlorine-containing resins will combine with asbestos and other natural silicates.

What I claim is:

1. A curable thermosettable composition comprising (A) a polyester resin of (a) an inorganic esterifying agent selected from the group consisting of boric acid, ortho-phosphoric acid, meta-phosphoric acid, polyphosphoric acid, poly-functional chlorine derivatives of said phosphoric acids and phosphorus trichloride with (b) a substantial proportion of a polyhydric phenol having an unsubstituted position in the nucleus reactive with formaldehyde, said polyester resin containing a substantial proportion of unesterified phenolic hydroxy groups, and (B) a member selected from the group consisting of formaldehyde and a compound yielding formaldehyde under curing conditions, said member being present in a proportion sufficient to cure the composition.

2. A curable thermosettable composition comprising (A) a polyester resin of (a) an inorganic esterifying agent selected from the group consisting of boric acid, ortho-phosphoric acid, meta-phosphoric acid, polyphosphoric acid, poly-functional chlorine derivatives of said phosphoric acids and phosphorus trichloride with (b) a substantial proportion of a polyhydric phenol having an unsubstituted position in the nucleus reactive with formaldehyde, said polyester resin containing a substantial proportion of unesterified phenolic hydroxy groups, (B) a member selected from the group consisting of formaldehyde and a compound yielding formaldehyde under curing conditions, said member being present in a proportion sufficient to cure the composition, and (C) a filler.

3. A curable thermosettable composition comprising (A) a polyester resin of (a) an inorganic esterifying agent selected from the group consisting of boric acid, ortho-phosphoric acid, meta-phosphoric acid, polyphosphoric acid, poly-functional chlorine derivatives of said phosphoric acids and phosphorus trichloride with (b) a substantial proportion of a polyhydric phenol having an unsubstituted position in the nucleus reactive with formaldehyde, said polyester resin containing a substantial proportion of unesterified phenolic hydroxy groups, (B) a member selected from the group consisting of formaldehyde and a compound yielding formaldehyde under curing conditions, said member being present in a proportion sufficient to cure the composition, and (C) a solvent.

4. A process for the production of a cured phenolic resin which comprises heating (A) a polyester resin of (a) at least one inorganic esterifying agent selected from the group consisting of boric acid, ortho-phosphoric acid, meta-phosphoric acid, polyphosphoric acid, poly-functional chlorine derivatives of said phosphoric acids and phosphorus trichloride with (b) a substantial proportion of a polyhydric phenol having an unsubstituted position in the nucleus reactive with formaldehyde, said polyester resin containing a substantial proportion of unesterified phenolic hydroxy groups, with (B) a sufficient amount of a curing agent selected from the group consisting of formaldehyde and a compound yielding formaldehyde to effect a cure.

5. A process for the production of a cured phenolic resin which comprises heating (A) a polyester resin of (a) a mixture of more than one inorganic esterifying agent selected from the group consisting of boric acid, ortho-phosphoric acid, meta-phosphoric acid, polyphosphoric acid, poly-functional chlorine derivatives of said phosphoric acids and phosphorus trichloride with (b) a substantial proportion of a polyhydric phenol having an unsubstituted position in the nucleus reactive with formaldehyde, said polyester resin containing a substantial proportion of unesterified phenolic hydroxy groups, with (B) a sufficient amount of a curing agent selected from the group consisting of formaldehyde and a compound yielding formaldehyde to effect a cure.

6. A process for the production of a cured phenolic resin which comprises heating (A) a polyester resin of (a) polyphosphonitrilic chloride with (b) a substantial proportion of a polyhydric phenol having an unsubstituted position in the nucleus reactive with formaldehyde, said polyester resin containing a substantial proportion of unesterified phenolic hydroxy groups, with (B) a sufficient amount of a curing agent selected from the group consisting of formaldehyde and a compound yielding formaldehyde to effect a cure.

7. A process for the production of a cured phenolic resin which comprises heating (A) a polyester resin of (a) at least one inorganic esterifying agent selected from the group consisting of boric acid, ortho-phosphoric acid, meta-phosphoric acid, polyphosphoric acid, poly-functional chlorine derivatives of said phosphoric acids and phosphorus trichloride with (b) a substantial proportion of a polyhydric phenol having an unsubstituted position in the nucleus reactive with formaldehyde and (c) a monohydric phenol, said polyester resin containing a substantial proportion of unesterified phenolic hydroxy groups, with (B) a sufficient amount of a curing agent selected from the group consisting of formaldehyde and a compound yielding formaldehyde to effect a cure.

8. A process for the production of a cured phenolic resin which comprises heating (A) a polyester resin of (a) at least one inorganic esterifying agent selected from the group consisting of boric acid, ortho-phosphoric acid, meta-phosphoric acid, polyphosphoric acid, poly-functional chlorine derivatives of said phosphoric acids and phosphorus trichloride with (b) a substantial proportion of a polyhydric phenol having an unsubstituted position in the nucleus reactive with formaldehyde and (c) a partial ester of a monohydric phenol with one of said inorganic esterifying agents, said polyester resin containing a substantial proportion of unesterified phenolic hydroxy groups, with (B) a sufficient amount of a curing agent selected from the group consisting of formaldehyde and a compound yielding formaldehyde to effect a cure.

9. A process for the production of a cured phenolic resin which comprises heating (A) a polyester resin of (a) at least one inorganic esterifying agent selected from the group consisting of boric acid, ortho-phosphoric acid, meta-phosphoric acid, polyphosphoric acid, poly-functional chlorine derivatives of said phosphoric acids and phosphorus trichloride with (b) a substantial proportion of a polyhydric phenol having an unsubstituted position in the nucleus reactive with formaldehyde, said polyester resin containing a substantial proportion of unesterified phenolic hydroxy groups, with (B) a sufficient amount of a curing agent selected from the group consisting of formaldehyde and a compound yielding formaldehyde to effect a cure, the amount of said curing agent being at most 10% by weight based on the weight of the polyester resin.

References Cited in the file of this patent

UNITED STATES PATENTS

| | | |
|---|---|---|
| 2,058,394 | Arvin | Oct. 27, 1936 |
| 2,214,769 | Lipkin | Sept. 17, 1940 |
| 2,330,286 | Honel | Sept. 28, 1943 |
| 2,414,415 | Rhodes | Jan. 14, 1947 |
| 2,437,710 | Rhodes | Mar. 16, 1948 |
| 2,605,248 | Fisk | July 29, 1952 |
| 2,606,887 | Pearce | Aug. 12, 1952 |
| 2,606,888 | Williams et al. | Aug. 12, 1952 |
| 2,623,866 | Twiss et al. | Dec. 30, 1952 |
| 2,636,876 | Zenftman et al. | Apr. 28, 1953 |
| 2,703,792 | Kropa | Mar. 8, 1955 |

OTHER REFERENCES

Parkington: Textbook of Inorganic Chemistry (1950), MacMillan & Co. London, pp. 591–592.